United States Patent
Rothwell (10) Patent No.: US 9,760,715 B2
(45) Date of Patent: *Sep. 12, 2017

(54) COMPUTER PROTECTION AGAINST MALWARE AFFECTION

(71) Applicant: William Grant Rothwell, Lohn-Ammannsegg (CH)

(72) Inventor: William Grant Rothwell, Lohn-Ammannsegg (CH)

(73) Assignee: William Grant Rothwell, Lohn-Ammannsegg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,003

(22) Filed: Jul. 23, 2015

(65) Prior Publication Data

US 2015/0332047 A1 Nov. 19, 2015

Related U.S. Application Data

(63) Continuation of application No. 11/814,305, filed as application No. PCT/GB2006/050013 on Jan. 18, 2006, now Pat. No. 9,129,111.

(30) Foreign Application Priority Data

Jan. 20, 2005 (EP) .................................. 05001120

(51) Int. Cl.
*H04L 29/06* (2006.01)
*G06F 21/56* (2013.01)
*H04L 9/32* (2006.01)

(52) U.S. Cl.
CPC .......... *G06F 21/566* (2013.01); *G06F 21/567* (2013.01); *G06F 2221/034* (2013.01)

(58) Field of Classification Search
CPC ................. G06F 21/566; G06F 21/567; G06F 2221/034; G06F 21/56; H04L 29/06877; H04L 63/145; H04L 63/14
(Continued)

(56) References Cited

U.S. PATENT DOCUMENTS 6,549,934 B1 * 4/2003 Peterson ................. H04L 49/90
709/203
6,615,350 B1   9/2003 Schell et al.
(Continued)

FOREIGN PATENT DOCUMENTS

EP    1 429 247 A2    6/2004
WO    WO 01/61473 A1    8/2001
WO    WO 02/061557 A2    8/2002

OTHER PUBLICATIONS

Co-pending U.S. Appl. No. 11/814,305, filed Jul. 19, 2007.
(Continued)

*Primary Examiner* — Gary Garcia
(74) *Attorney, Agent, or Firm* — Renner, Otto, Boisselle & Sklar, LLP (57) ABSTRACT

A method is provided of protecting a computer against malware affection. The computer has a data storage and an operating system for managing the data storage. The method comprises providing a filter module in the operating system which operates to detect an attempt to store data in the data storage, to determine a data format of the data to be stored in the data storage, and to prevent storage of the data if the data format is determined to relate to a predefined type. The filter module may be provided as a file system filter driver in a kernel of the operating system. The filter module may be arranged to operate between an input/output manager of the operating system and a driver associated with the data storage. The input/output manager and driver associated (Continued)

with the data storage may form part of the kernel of the operating system.

12 Claims, 5 Drawing Sheets

(58) Field of Classification Search
USPC .......................................... 726/24; 713/165
See application file for complete search history.

(56) References Cited

U.S. PATENT DOCUMENTS

| | | | |
|---|---|---|---|
| 6,986,058 B1 | 1/2006 | Friedman et al. | |
| 6,993,649 B2 | 1/2006 | Hensley | |
| 7,043,697 B1 | 5/2006 | Jensen et al. | |
| 7,278,158 B2 | 10/2007 | Peretti | |
| 7,328,456 B1* | 2/2008 | Szor | G06F 21/56 713/165 |
| 7,444,317 B2 | 10/2008 | Pudipeddi et al. | |
| 7,478,431 B1 | 1/2009 | Nachenberg | |
| 7,599,907 B2 | 10/2009 | Havewala et al. | |
| 7,676,508 B2 | 3/2010 | Robert | |
| 7,694,328 B2 | 4/2010 | Joshi et al. | |
| 2001/0020245 A1 | 9/2001 | Golds et al. | |
| 2001/0044904 A1 | 11/2001 | Berg et al. | |
| 2002/0013910 A1* | 1/2002 | Edery | G06F 21/52 726/24 |
| 2002/0129277 A1 | 9/2002 | Caccavale | |
| 2002/0133711 A1* | 9/2002 | Peretti | G06F 21/78 713/193 |
| 2002/0156756 A1 | 10/2002 | Stanley et al. | |
| 2002/0174102 A1* | 11/2002 | Kyler | G06F 9/52 |
| 2003/0145317 A1* | 7/2003 | Chamberlain | G06F 8/61 717/177 |
| 2003/0177435 A1* | 9/2003 | Budd | H03M 13/096 714/776 |
| 2003/0182422 A1* | 9/2003 | Bradshaw | G06F 17/30082 709/225 |
| 2003/0212913 A1 | 11/2003 | Vella | |
| 2004/0002942 A1* | 1/2004 | Pudipeddi | G06F 17/30067 |
| 2004/0064604 A1 | 4/2004 | Cox | |
| 2004/0083381 A1* | 4/2004 | Sobel | G06F 21/562 726/24 |
| 2004/0098394 A1 | 5/2004 | Merritt et al. | |
| 2004/0111389 A1* | 6/2004 | Pudipeddi | G06F 9/4411 |
| 2004/0215649 A1* | 10/2004 | Whalen | G06F 8/10 |
| 2004/0221172 A1* | 11/2004 | Stamos | G06F 21/606 726/27 |
| 2004/0255165 A1* | 12/2004 | Szor | G06F 21/566 726/24 |
| 2005/0022012 A1* | 1/2005 | Bluestone | G06F 21/53 726/4 |
| 2005/0044418 A1 | 2/2005 | Miliefsky | |
| 2005/0076041 A1* | 4/2005 | Stakutis | G06F 17/30106 |
| 2005/0091655 A1 | 4/2005 | Probert et al. | |
| 2005/0097143 A1 | 5/2005 | Pudipeddi et al. | |
| 2005/0111051 A1* | 5/2005 | Uchikawa | H04N 1/00326 358/448 |
| 2005/0149726 A1* | 7/2005 | Joshi | G06F 21/51 713/164 |
| 2005/0182944 A1* | 8/2005 | Wagner | G06F 21/305 713/182 |
| 2006/0047805 A1* | 3/2006 | Byrd | G06F 11/3495 709/224 |
| 2006/0047859 A1* | 3/2006 | Cavalaris | G06F 9/4411 710/8 |
| 2006/0053228 A1 | 3/2006 | Rachman et al. | |
| 2006/0101264 A1 | 5/2006 | Costea et al. | |
| 2006/0101476 A1 | 5/2006 | Robert | |
| 2006/0116985 A1 | 6/2006 | Thind et al. | |
| 2006/0117056 A1 | 6/2006 | Havewala et al. | |
| 2006/0117063 A1 | 6/2006 | Havewala et al. | |
| 2009/0038011 A1 | 2/2009 | Nadathur | |

OTHER PUBLICATIONS

International Search Report for corresponding International Application No. PCT/GB2006/050013 mailed Jul. 18, 2006.
Form PCT/ISA/237 for corresponding International Application No. PCT/GB2006/050013 dated Jul. 18, 2006.
M. Russinovich; "Inside On-Access Virus Scanners"; Windows & .Net Magazine Network; Sep. 1997; XP002221700.
"Sophos Antivirus"; Windows NT/2000/XP singler user Installation guide; Jan. 2004; XP002312356.
M. Schmid et al.; "Protecting Data from Malicious Software"; Computer Security Applications Conference; Dec. 2002; Piscataway, NJ USA; IEEE; pp. 199-208; XP010627031.
Winability Software Corp.; "Folder Guard User's Guide—Using the Filter's"; Internet URL: http://web.archive.org/web/20041023085327/www.winability.com/folderguard/users-guide_filters.htm Oct. 2004; XP002323880.
McAfee Security; "Product Guide—VirusScan Enterprise Version 7.0"; Mar. 2003; pp. 52-53; figure 3.11; p. 55; figure 3.12; pp. 63-65; XP002312358.
Frisk Software International; "W32/Swen.A@mm"; Internet URL: http://web.archive.org/web/20040411010214/http://www.f-prot.com/virusinfo/print/descriptions/swena.html; Apr. 2004; XP002327771.

* cited by examiner

COMPUTER PROTECTION AGAINST MALWARE AFFECTION

BACKGROUND OF THE INVENTION

1. Field of the Invention

The present invention relates generally to computer protection against malware affection and more particularly to a computer program product and a method for protecting a computer against malware affection and with a computer protected against malware affection.

2. Description of the Related Art

Malware is a short term used in the art for malicious software summarizing computer programs performing actions on computer systems without the consent of a user, often developed for the purpose of doing harm to the computer system or the user, and comprises for example so-called viruses, worms, Trojan horses, backdoors and spyware. The intended actions of malware widely varies and include stealing users' personal information, stealing other data, abusing the computer system or simply vandalize.

Usually a target computer is first attacked by malware in a warhead phase exploiting weaknesses of the computer systems, as for example producing a buffer overrun, for enabling a propagation phase. The warhead phase is executed by a very small program code portion of the malware. In the propagation phase the body program code of the malware is transferred to the target computer. Typically several phases follow the propagation phase by executing the body program code as for example a target selection phase, in which the malware is seeking for other computers accessible from the target computer, a scanning phase, in which accessible other computers are checked to be suitable target computers for further propagation, and a payload phase, in which the intended purposes of the malware are performed.

To prevent malware affecting a computer system several protections are known in the art as for example virus filters running on computers or firewalls controlling the traffic between connected computer systems. These protections recognize malware using malware descriptions which define specific characteristics of certain malware. They usually analyze data, check if the data shows some of the specific characteristics and take action if the data is identified as being malware. For example, the data is deleted or quarantined. A common technique for analyzing the data is pattern matching, wherein the data is scanned for predefined specific bit patterns defined to be malware bit patterns in the malware descriptions. The analysis usually is quite processing-intensive and can reduce the performance of the computer system. The effectiveness of the above described protections is highly dependent on the up-to-dateness of the malware descriptions since malware is only recognized after the malware descriptions have been updated. Nevertheless, in the time period between the deployment of malware and the update of the malware descriptions in the computer system the computer system is vulnerable. It is therefore a delicate, difficult, labour-intensive and cost-intensive task to update the descriptions as fast as possible, which is usually done by specialized service providers.

Schmid et al "Protecting data from malicious software", Proc. 18$^{th}$ Annual Computer Security Applications Conference, 2002, 9-13 Dec. 2002, Piscataway, N.J., USA, IEEE, describes an application called FileMonster®. The FileMonster® application uses a driver that works at the imaginary boundary between the user mode and protected kernel space; it intercepts at the point where user mode function calls are translated into kernel API calls, i.e. using service dispatch tables mapping. This is an undocumented approach.

The W32/Swen.A@mm worm that appeared in September 2003 is described in Frisk Software International: "W32/Swen.A@mm" (retrievable from the Internet at http://web.archive.org/web/20040411010214/http://www.f-prot.com/virusinfo/print/descriptions/swena.html). As a way to persist on the victim computer, the worm made auto-start entries in the Registry so that the system would load the worm's executable code on boot up. A random name was used for the worm's image file to avoid detection, i.e. <random_characters>.exe.

Winability Software Corp's "Folder Guard User's Guide—Using the filters" (retrievable from the Internet at: http://web.archive.org/web/20041023085327/www.winability.com/folderguard/users-guide_filters.htm; see also http://www.winability.com/folderguard/users-guide-printable.htm) describes a system that stops other users from opening or seeing a user's personal files; it can also protect sensitive system files from modification or destruction. Folder Guard allows and disallows program execution using a white list (explicitly allowing certain applications to run) and a black list (explicitly disallowing certain applications to run). This implies the program files already exist on the computer, and Folder Guard performs check to allow or disallow when the program is able to run.

The McAfee® Security "Product Guide—VirusScan Enterprise version 7.0" (7 Mar. 2003) document describes a virus scanning, detection and removal program that can use of file extensions to allow a user to configure the program scanning behaviours. Based on the user's selection, the program can scan the file on 'read' access, 'write access' or 'on network'. The application uses conventional scanning and pattern matching techniques to detect viruses. Similarly, the "Sophos® Antivirus—Windows NT/2000/XP single user installation guide" describes an application that scans a file for virus detection on a read access, or on write and other accesses.

EP-A-1,429,247 (Microsoft Corporation) relates to a new approach as to how a file system filter driver should be implemented.

Other known techniques are disclosed in: (a) "Inside On-Access Virus Scanners", M. Russinovich, Windows & .NET Magazine Network, September 1997 (1997-09); (b) WO 01/61473; and (c) WO 02/061557.

In view of the disadvantages of the hitherto-known, above described protections against malware affection, it is desirable to provide an improved, effective, fast and easy to maintain computer protection against malware.

SUMMARY OF THE INVENTION

According to a first aspect of the present invention, there is provided a method of protecting a computer against malware affection, the computer having a data storage and an operating system for managing the data storage, the method comprising providing a filter module in the operating system which operates to detect an attempt to store data in the data storage, to determine a data format of the data to be stored in the data storage, and to prevent storage of the data if the data format is determined to relate to a predefined type, characterised in that the filter module operates to prevent storage of the data to a new file on the data storage not derived from a previously existing file on the data storage, and in that the predefined type of data format is an executable data format, thereby acting to thwart malware at its propagation phase by preventing it from saving its execution code to the data storage.

The filter module may be provided as a file system filter driver in a kernel of the operating system.

The filter module may be arranged to operate between an input/output (I/O) manager of the operating system and a driver associated with the data storage.

The input/output (I/O) manager may form part of a kernel of the operating system.

The driver associated with the data storage may form part of a kernel of the operating system.

The method may comprise the file system filter driver receiving at least write access calls from the input/output (I/O) manager intended for the kernel driver associated with the data storage, blocking such write access calls relating to data of the format of the predefined type, and such passing write access calls not so relating.

The method may comprise informing the input/output (I/O) manager about the blocking and optionally passing of such write access calls.

The method may comprise arranging for I/O Request Packets that are sent from the input/output (I/O) manager and intended for the driver associated with the storage to be re-routed via the filter module, the re-routed I/O Request Packets being at least those of a type enabling the filter module to detect an attempt to store data in the data storage.

The method may comprise querying a function code of a re-routed I/O Request Packet at the filter module to detect an attempt to store data in the data storage The re-routed I/O Request Packets may comprise those relating to the creation of a new file in the data storage.

The re-routed I/O Request Packets may comprise those having or associated with an IRP_MJ_CREATE function code.

The re-routed I/O Request Packets may comprise those relating to the writing to an existing file on the storage. The existing file may be a recently-created file.

The re-routed I/O Request Packets may comprise those having or associated with an IRP_MJ_WRITE function code.

The method may comprise blocking a re-routed I/O Request Packet at the filter module if it is determined that the format of the data to be stored by way of that I/O Request packet is of the predefined type.

The method may comprise determining the format of the data to be stored by examining the intended file extension of the file to be created.

The method may comprise determining the format of the data to be stored by examining a predetermined portion of the file to be written, for example its file header. The file header may be the Portable Executable File Format (PE) file header.

The method may comprise referring to at least one parameter associated with the filter module preferably stored in a protected manner in the data storage, and determining the behaviour of the filter module at least in part in dependence on the at least one parameter.

The method may comprise running a protected administration module which allows a verified user to adapt the at least one parameter.

The method may comprise storing the at least one parameter in a protected part of a system database of the operating system. The system database may comprise the Registry.

The method may comprise reading the at least one parameter during the booting of the computer.

The at least one parameter may comprise a predefined blocking file extension as the predefined type, and comprising the filter module detecting the format of the data to be stored by comparing a specific file extension of the data to the predefined blocking file extension.

The at least one parameter may comprise a flag, wherein the flag is able to be set to a predefined status, and comprising the filter module checking the flag and preventing storage of the data if the flag is set to the predefined status.

The at least one parameter may comprise a non-block user identification, and comprising the filter module checking the non-block user identification as well as an active user identification and allowing the storage of the data if the non-block user identification matches the active user identification.

The method may comprise providing an administration application to allow a user to alter the behaviour of the filter module by sending the filter module runtime instructions.

The method may comprise using the administration application to turn off blocking temporarily.

The administration application may be operable to alter the behaviour of the filter module by changing, or causing the filter module to change, at least one of the at least one parameter.

The method may comprise authenticating the administration application to the filter module.

The method may comprise the filter module storing a name or identifier of the filter module in a protected manner in the data storage in such a way that only the administration application can reasonably learn of the name or identifier and thereby communicate with the filter module.

The method may comprise registering the name in the operating system.

The name or identifier of the filter module may be stored in a protected manner in the data storage by changing it from time to time during runtime.

The method may comprise authenticating the administration application to the filter module using a cryptographic authentication method.

The method may comprise logging activities of the filter module.

The format of the data to be stored may be determined by examining the structure of the data. The filter module may operate to prevent storage of such data to any part of the storage.

The operating system may be one of the Windows® family of operating systems.

According to a second aspect of the present invention, there is provided method of thwarting malware at its propagation phase by performing a method according to the first aspect of the present invention so as to block any unauthorised attempt to write any data to the data storage that could potentially constitute malware, thereby preventing the malware from propagating.

According to a third aspect of the present invention, there is provided method of administrating a computer having a kernel driver and an administration application that communicates with the kernel driver during runtime, comprising authenticating the administration application to the kernel driver.

The method may comprise using a cryptographic method to authenticate the administration application to the kernel driver.

According to a fourth aspect of the present invention, there is provided a method of authenticating an administration application to a kernel driver for use in a method according to the third aspect of the present invention, comprising using a dynamic driver identifier that is made to change during runtime in a way such that only the administration application can reasonably learn of the current driver identifier and thereby communicate with the kernel driver.

The kernel driver may be a file system filter driver.

According to a fifth aspect of the present invention, there is provided computer comprising a data storage, an operating system for managing the data storage, and a filter module provided in the operating system for protecting the computer against malware affection, the filter module being adapted to detect an attempt to store data in the data storage, to determine a data format of the data to be stored in the data storage, and to prevent storage of the data if the data format is determined to relate to a predefined type, characterised in that the filter module is adapted to prevent storage of the data to a new file on the data storage not derived from a previously existing file on the data storage, and in that the predefined type of data format is an executable data format, the filter module thereby being adapted to thwart malware at its propagation phase by preventing it from saving its execution code to the data storage.

According to a sixth aspect of the present invention, there is provided computer program which, when run on a computer, causes the computer to carry out a method according to the first aspect of the present invention.

According to a seventh aspect of the present invention, there is provided a computer program which, when loaded into a computer, causes the computer to become one according to the fifth aspect of the present invention.

The computer program may be carried on a carrier medium. The carrier medium may be a transmission medium. The carrier medium may be a storage medium.

One embodiment of the present invention provides a computer program product for protecting a computer against malware affection, wherein the computer has a data storage and an operating system managing the data storage. The computer program product comprises computer readable program code means for causing the computer to run a filter module. The computer readable program code means cause the computer to run the filter module in the operating system, and the filter module is configured to detect a format of data to be stored or altered in the data storage. The filter module prevents storage or alteration of the data if the format is of a predefined type. By predefining the types of format of malware data, which typically is any format executable by the operating system, the filter module interferes the malware life cycle at the critical point of its propagation phase by preventing the storage of the malware in the data storage. Without propagation the malware is not able to execute its payload and is effectively terminated. The detection of the format can easily happen without any prior knowledge about current malware and without further data analysis such as scanning the data and searching for specific bit patterns. The running filter module protects the computer in an efficient and fast way, e.g. as a pure software implementation, against known and future malware using the predefined data format types, with no need of updating any malware descriptions and irrespective to operating system privileges of caller processes and threads. It also protects the computer against malware using common mechanisms to bypass its detection such as polymorphism and renaming files. Because the computer runs the filter module in the operating system, the protection against malware is effective on all current data storage devices accessible by the computer as well as all future data storage devices accessible by the computer without requiring any adaptation related to the malware protection.

In a preferred embodiment the program code means are adapted to cause the computer to run the filter module as a file system filter driver in a kernel of the operating system. This assures that all read/write access requests originated from any user mode application or from any system process, which are directed to any data storage device associated to the computer, are treated by the filter module. The filter module running in the kernel does not have any additional impact on the behaviour or the performance of the computer. Since the kernel of the operating system is launched at a very early stage of the booting process of the computer, the malware protection is effective from scratch and especially before system processes are running Furthermore, running the filter module in the kernel allows a malware protection irrespective of users' operating system access rights or the operating system access rights of a user simulated by the malware.

Preferably the program code means are adapted to cause the computer to run the file system filter driver configured to receive read and write access calls from an input/output manager of the kernel and further configured to block write access calls related to data of the format of the predefined type. Further the program code means are adapted to run the file system filter driver configured to inform the input/output manager about the blocking and finally to transfer non-blocked read and write access calls to further system drivers of the kernel. Because the file system filter driver receives the read and write access calls from the input/output manager and not directly from an application running in a user mode of the computer, the filter driver is independent of service dispatch tables matching user mode access calls to kernel mode access calls. These service dispatch tables usually are not documented and not supported by the operating system manufacturer and may change in future versions of the operating system. By transferring non-blocked read and write access calls to further system drivers, i.e. file system drivers as for example NTFS (New Technology File System—one of the file systems for the Windows NT (New Technology) operating system by Microsoft Corporation), FAT (File Allocation Table—a file system for various operating systems of Microsoft Corporation) or CDFS (CD ROM (Compact Disk Read Only Memory) File System—a driver for CD ROM players used in certain operating systems of Microsoft Corporation), and not directly to hardware drivers of storage media, the filter module does not need to consist of different classes of filter drivers, each fitting to a storage medium present on the computer, for example a local or a remote hard disk, a backup tape, a memory stick or an optical read/write device.

In a preferred embodiment the program code means are adapted to cause the computer to store a parameter of the filter module in a protected manner in the data storage, to run the filter module adjusted by the parameter, and to run a protected administration module configured to allow a verified user to adapt the parameter. Using parameters for the adjustment of the filter module is an easy way to be able to adapt the malware protection to the changing needs during life time of the malware protection even while it is running The administration module can be used to adapt the parameter and to trigger the adjustment of the filter module using the changed parameter. It is typically run as a protected user application.

Preferably the program code means are adapted to cause the computer to store the parameter in a protected part of a system database of the operating system, further to cause the computer to read the parameter while booting the computer, and finally to cause the computer to run the filter module adjusted by the parameter. System databases, such as for example the Registry of the Windows® operating systems by Microsoft Corporation, are commonly used to store configuration information of a computer system comprising hardware information, user information, application information, and other information. It can easily be used to store the parameters for adjusting the filter module. In particular while booting the computer the parameters can be read and the filter module can be adjusted. This assures that the malware protection is always customized to the needs of the user and does not run in another configuration.

In a preferred embodiment the program code means are adapted to cause the computer to run the filter module in a way to store a name of the filter module in a protected manner in the data storage and in a way to register the name in the operating system. Such a filter module is able to change its name from time to time or on request, e.g. triggered by a user operating the administration module, and to register the changed name, i.e. the file system filter driver name, in the operating system and to store the name, particularly as a parameter, in a protected part of the system database, for making it accessible to the registration of the filter module during the boot process of the computer. Using such a dynamic name of the filter module allows the filter module to be undetectable and unreferable for programs (including malware) other than the administration module, which knows how and where to look up the current name of the filter module.

The program code means can be adapted to cause the computer to store a predefined blocking file extension as the predefined type of data format in a protected manner in the data storage and to run the filter module in a way to detect the format of the data to be stored or to be altered by comparing a specific file extension of the data to the predefined blocking file extension. The extension of a data file is a common way to define the data format of a data file and consists for example of a dot and few letters attached to the name of the data file, i.e. Windows operating systems by Microsoft Corporation use in general a dot and three letters following the file name to specify the data format e.g. ".doc", ".xls" or ".txt". The file extension can be used as an indication if a data file is potentially executable by the operating system and therefore be potential malware. A list of such potential malware file extensions can be stored in the data storage, in particular as parameters in a protected part of the system database, in order to be compared to the file extension of the data to be stored or to be altered in the data storage. For Windows operating systems by Microsoft Corporation This can for example be a list comprising the extensions ".COM", ".EXE", ".DLL", ".BAT", ".CMD", ".OCX", ".VBS", ".PIF", ".SCR", ".CHM", ".DRV", ".HTA", ".SHS", ".WMA", ".WSF", ".WSH", ".CPL", ".CAB".

Preferably the program code means are adapted to cause the computer to store a flag in a protected manner in the data storage, wherein the flag is able to be set to a predefined status. The filter module is configured to check the flag, and is further configured to detect the format of the data to be stored or to be altered as well as to prevent the storage or alteration of the data if the flag is set to the predefined status. Such a flag, in particular stored as a parameter in a protected part of the system database, can be used to switch the filter module on or off during the boot process of the computer, or triggered by the administration module. For example, there can be the need to switch the filter module off to be able to store data files of a blocked predefined data format in the data storage, e.g. during installation of new software on the computer.

The program code means can be adapted to cause the computer to store a non-block user identification in a protected manner in the data storage, and to run the filter module in a manner to check the non-block user identification as well as an active user identification, and to intercept the prevention of the storage or alteration of the data if the non-block user identification matches the active user identification. The storage of such non-block user identifications, in particular as parameters in a protected part of the system database, can be useful to ease the administration of a computer on which often data of the blocked predefined format is regularly saved, e.g. by installation of software. A user who is identified as a non-block user bypasses the filter module in a secure controlled way.

Preferably the program code means are adapted to cause the computer to log activities of the filter module. The log of the activities of the filter module can e.g. be used to analyze the effectiveness of the malware protection, to find unwanted data file filtration, or just for statistical reasons.

Another embodiment of the present invention relates to a computer protected against malware affection having a data storage and an operating system managing the data storage. The computer is configured to run a filter module in the operating system, wherein the filter module is configured to detect a format of data to be stored or altered in the data storage and to prevent storage or alteration of the data if the format is of a predefined type.

The advantages of the computer protected against malware affection and of its preferred embodiments are the same as the advantages of the corresponding computer program product and the corresponding preferred embodiments of the computer program product. They are therefore not explicitly repeated and can be found above.

In a preferred embodiment the computer is adapted to run the filter module as a file system filter driver in a kernel of the operating system.

Preferably the file system filter driver is configured to receive read and write access calls from an input/output manager of the kernel. Further, it is configured to block write access calls related to data of the format of the predefined type, to inform the input/output manager about the blocking and to transfer non-blocked read and write access calls to further system drivers of the kernel.

In a preferred embodiment the computer is adapted to store a parameter of the filter module in a protected manner in the data storage. The filter module is configured to run adjusted by the parameter, and the computer is adapted to run a protected administration module allowing a verified user to adapt the parameter.

Preferably the computer is adapted to store the parameter in a protected part of a system database of the operating system, further to read the parameter while booting, and finally to run the filter module adjusted by the parameter.

In a preferred embodiment the filter module is configured to store a name of the filter module in a protected manner in the data storage and to register the name in the operating system.

The computer can be adapted to store a predefined blocking file extension as the predefined type in a protected manner in the data storage, wherein the filter module is configured to detect the format of the data to be stored or to be altered by comparing a specific file extension of the data to the predefined blocking file extension.

Preferably the computer is adapted to store a flag in a protected manner in the data storage. The flag is able to be set to a predefined status, and the filter module is configured to check the flag and to detect the format of the data to be stored or to be altered as well as to prevent the storage or alteration of the data if the flag is set to the predefined status.

The computer can be adapted to store a non-block user identification in a protected manner in the data storage. The filter module is configured to check the non-block user identification as well as an active user identification and to intercept the prevention of the storage or of the alteration of the data if the non-block user identification matches the active user identification.

Preferably the computer is adapted to log activities of the filter module.

Another embodiment of the present invention relates to a method for protecting a computer against malware affection, the computer having a data storage and an operating system managing the data storage. The method comprises the steps of running a filter module in the operating system, with the filter module detecting a data format of data to be stored or altered in the data storage and preventing the storage or alteration of the data if the format is of a predefined type.

The advantages of the method and of its preferred embodiments are the same as the advantages of the corresponding computer program product and the corresponding preferred embodiments of the computer program product. They are therefore not explicitly repeated and can be found above.

In a preferred embodiment the filter module is run as a file system filter driver in a kernel of the operating system.

Preferably the method comprises the steps of the file system filter driver receiving read and write access calls from an input/output manager of the kernel, blocking write access calls related to data of the format of the predefined type, informing the input/output manager about the blocking and transferring non-blocked read and write access calls to further system drivers of the kernel.

In a preferred embodiment the method comprises the steps of storing a parameter of the filter module in a protected manner in the data storage, adjusting the filter module by the parameter, and running a protected administration module which allows a verified user to adapt the parameter.

Preferably the method comprises the steps of storing the parameter in a protected part of a system database of the operating system, reading the parameter while booting the computer and adjusting the filter module using the parameter.

In a preferred embodiment the method comprises the steps of the filter module storing a name of the filter module in a protected manner in the data storage and registering the name in the operating system.

The method can comprise the steps of storing a predefined blocking file extension as the predefined type in a protected manner in the data storage and detecting the format of the data to be stored or to be altered by comparing a specific file extension of the data to the predefined blocking file extension by the filter module.

Preferably the method comprises the steps of storing a flag in a protected manner in the data storage, wherein the flag is able to be set to predefined status, the filter module checking the flag, detecting the format of the data to be stored or to be altered, and preventing the storage or alteration of the data if the flag is set to the predefined status.

The method can comprise the steps of storing a non-block user identification in a protected manner in the data storage, the filter module checking the non-block user identification as well as an active user identification and the filter module intercepting the prevention of the storage or alteration of the data if the non-block user identification matches the active user identification.

Preferably the method comprises the step of logging activities of the filter module.

DETAILED DESCRIPTION OF THE PREFERRED EMBODIMENTS

Before proceeding to a description of a specific embodiment of the present invention, an overview will first be provided. An embodiment of the present invention is founded on the basis that:

All running processes on a computer are executable code, including malware;

Executable code must be accessible on a computer to load and run, i.e. stored on disk; and therefore Malware cannot run or spread to other computers without execution code on a computer.

As mentioned above, the typical infection cycle of malware is (1) to cause its executable code to be stored on a computer using various means usually not in a user control or knowledge, (2) execute its code and (3) continue to spread its code to other computers, i.e. infection spreading. An embodiment of the present invention breaks malware infection by denying malware the ability to write its execution code to computers, which is critical in the malware life cycle. Malware typically exists in computer systems as a runnable program which is identified by its file extension. A few samples of executable file extensions on Microsoft® Windows® platforms are *.exe, *.dll, *.ocx *.vbs, and there are others. Robustly blocking these program files from being saved to a computer effectively stops malware infection.

The following uses a worm attack life cycle as an example to illustrate this in more detail.

1. A typical attack begins with what virus researchers called "warhead attack". A warhead is very small part of the malware code that exploits identified system vulnerabilities, e.g. buffer overrun attacks, to enable it to run on a computer. The warhead code is necessarily small with very limited functions; the infamous SQL Slammer has a warhead of 376 bytes.

2. The next step is to transfer the worm execution body code to the victim computer, i.e. saving a copy of the malware program file, and execute the code. This is known as the malware's "propagation phase". If successful, the malware seeks out other victims and continues its infection spread.
3. If a worm is not stopped, the rest of its cycle can be categorised as "target selection", where it locates other networked computers, "vulnerability scanning" to identify other vulnerable computers, and "payload attack" when it performs the intended malicious actions on the victim computer.

An embodiment of the present invention intercepts malware's life cycle at the critical point of propagation, i.e. saving its execution code in a program file to permanent storage. Without propagation, the malware cannot run its payload and is effectively terminated. Under the Windows® operating system, all file saving operations require system kernel services and no programs, including malware, can write to hardware directly, because of Windows® operating system's design and internal protection.

An embodiment of the present invention proactively protects computer from malware infection without using conventional methods. In one mode of operating an embodiment of the present invention, all executable files are blocked from being written to a computer that have not had the user's explicit approval. The term "malware" is used to describe virus, worm, Trojan, spyware, adware, rootkits and all unwanted software applications.

On Microsoft® Windows® platforms, all application programs require its executable code (image file) to reside on the hard disk (storage media) in order that the system can load the image file to memory and run. From the operating system perspective, malware is just another form of application program, which must have its execution code residing on the system disk to carry out its 'unwanted action' from the user's perspective. Malware spreads infection by transferring its execution code to a user computer by tricks and exploiting vulnerabilities on the system, e.g. buffer overrun attacks or email attachment.

Without execution code on a computer, malware will not be able to infect a computer nor spread to other computers. An embodiment of the present invention indiscriminately denies writing of executable files to hardware storage, at the file system level such as NTFS and FAT. An embodiment of the present invention scrutinizes kernel instructions (rather than API calls) to the file system to write files. It has a deny-write-by-default policy, and a feature is built in to allow writing of executables if a user explicitly approves them. Such a feature is necessary for the user to install new software and patching system files.

An embodiment of the present invention differs from anti-virus, anti-spyware, rootkit detection tools in protection methods in the following respects:

No pattern scanning—Anti-virus and anti-spyware products rely on scanning existing and incoming files against known malware signatures to detect virus/malware, e.g. McAfee®, Sophos®, and other major anti-virus products use this approach. Shortcomings are that this only works against known malware in the pattern database, and also degraded system performance.

No behaviour anomaly detection—Used by most anti-spyware tools and some newer anti-virus products. They monitor and intercept 'unusual' API calls, and 'unexpected' application behaviours, and flagged detection when anomaly is found. False-positive ratio is high and it is relatively easy to bypass by malware.

No system calls interception—Some tools intercept and manipulates system calls. They route API calls to their interceptor functions and manipulate the call by changing parameters or returning an execution failure status to the caller and not calling the requested API call, e.g. the FileMonster® application [see reference above and http://www.cigital.com/labs/projects/1021/]. This is not a Microsoft® approved approach.

No system memory scanning—Some solutions scan system memory similar to file-based scan and monitor memory access trying to detect unusual usage, e.g. buffer overrun detection. This is not proven effective against malware and is not effective to "zero day" malware variants.

Another difference between an embodiment of the present invention and existing anti-malware technology is that an embodiment of the present invention is a malware prevention technology and not a detection and clean tool like typical anti-virus and anti-spyware software. Another technical difference, which will become more readily understandable following the description below, is that the filter driver used in an embodiment of the present invention cannot be shut down by malicious software, as seen in many anti-malware applications. An embodiment of the present invention is integrated into the file system and loaded automatically during system boot up sequence.

Interception in an embodiment of the present invention is possible by taking advantage of Windows self-protection architecture design. Briefly, Windows® enforces privilege-checking mechanisms to guarantee system integrity, and the concept of kernel mode (Ring 0), and user mode (Ring 3) on Intel x86 CPU. The operating system (OS) prevents direct access to all hardware devices, such as a hard disk, by a thin layer of system software called the Hardware Abstraction Layer (HAL). When Windows® is running, all 'write' accesses are provided by Kernel service calls. By integrating into the kernel, an embodiment of the present invention scrutinizes what files are allowed to be saved. This prevents email-borne, Internet-borne and user-induced virus files from reaching the protected computer.

Figure 1:
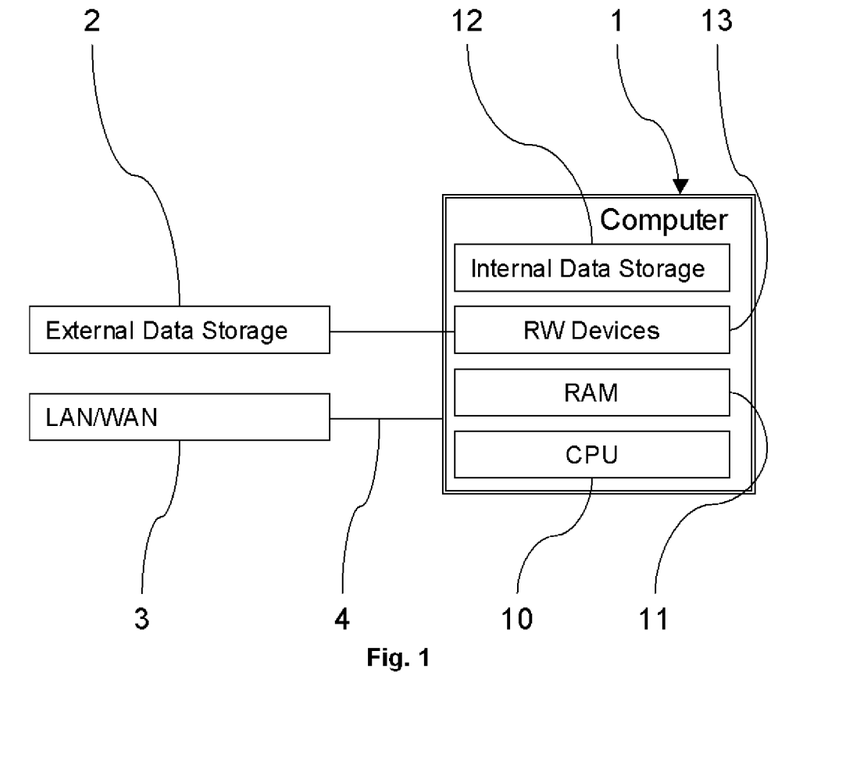
FIG. 1 shows a block diagram schematically illustrating components of a computer system which are of relevance for a protection against malware affection according to the invention.

FIG. 1 provides an overview of components of a computer system that are of relevance for protection against malware affection according to an embodiment of the invention. A computer 1, e.g. a personal computer, a server, a personal digital assistant (PDA) or a cellular phone, has a CPU 10 (Central Processing Unit) and RAM 11 (Random Access Memory—a type of volatile computer memory that can be accessed randomly, meaning any byte of memory can be accessed without touching the preceding bytes) which are involved in all processing of the computer 1. It further has a data storage 157 (see FIG. 2) comprising an internal data storage 12 and an external data storage 2 and RW Devices 13 (Read Write Devices). The internal data storage 12 usually comprises at least a hard disk on which data can be stored, changed and deleted. The external data storage 2 comprises on one hand removable data media such as for example floppy disks, CD-ROM (Compact Disks-Read-Only Memory—a type of optical disk), DVD (Digital Versatile Disks—another type of optical disk) memory token as e.g. memory sticks, or multi media devices, e.g. cameras or music players usually containing removable data storage media or hard disks themselves. On the other hand the external data storage 2 comprises remote data storage media such as for example shared network drives. The RW Devices 13 are capable of reading and/or writing to the external data storage 2 and summarize for example on one hand floppy disk drives, CD-ROM drives, DVD drives and ports for the multimedia devices or the memory token such as e.g. USB (Universal Serial Bus) or Firewire, for the use of the removable data storage media, and on the other hand network ports for the use of the remote data storage media. Connected to the computer 1 is a network LAN/WAN 3 (Local Area Network/Wide Area Network as e.g. the Internet) by a link 4 which can be either a wired link or a wireless link. The LAN/WAN 3 is usually used by malware to deploy and to get access to computer 1.

Typically the computer 1 is running an OS (Operating System—e.g. Microsoft® Windows®, UNIX, OS/2 or Linux) which is the system program responsible for the direct control and management of hardware including the data storage 157 (see FIG. 2) and basic system operations, as well as running application software. The central module of the OS loaded first while booting the computer 1 and remaining in the RAM 11 usually is called kernel. Typically the kernel is responsible for memory management, process and task management, user interfacing, and disk management. Because it stays in RAM 11, it is important for the kernel to be as small as possible while still providing all the essential services required by other parts of the operating system and by application software.

Figure 2:
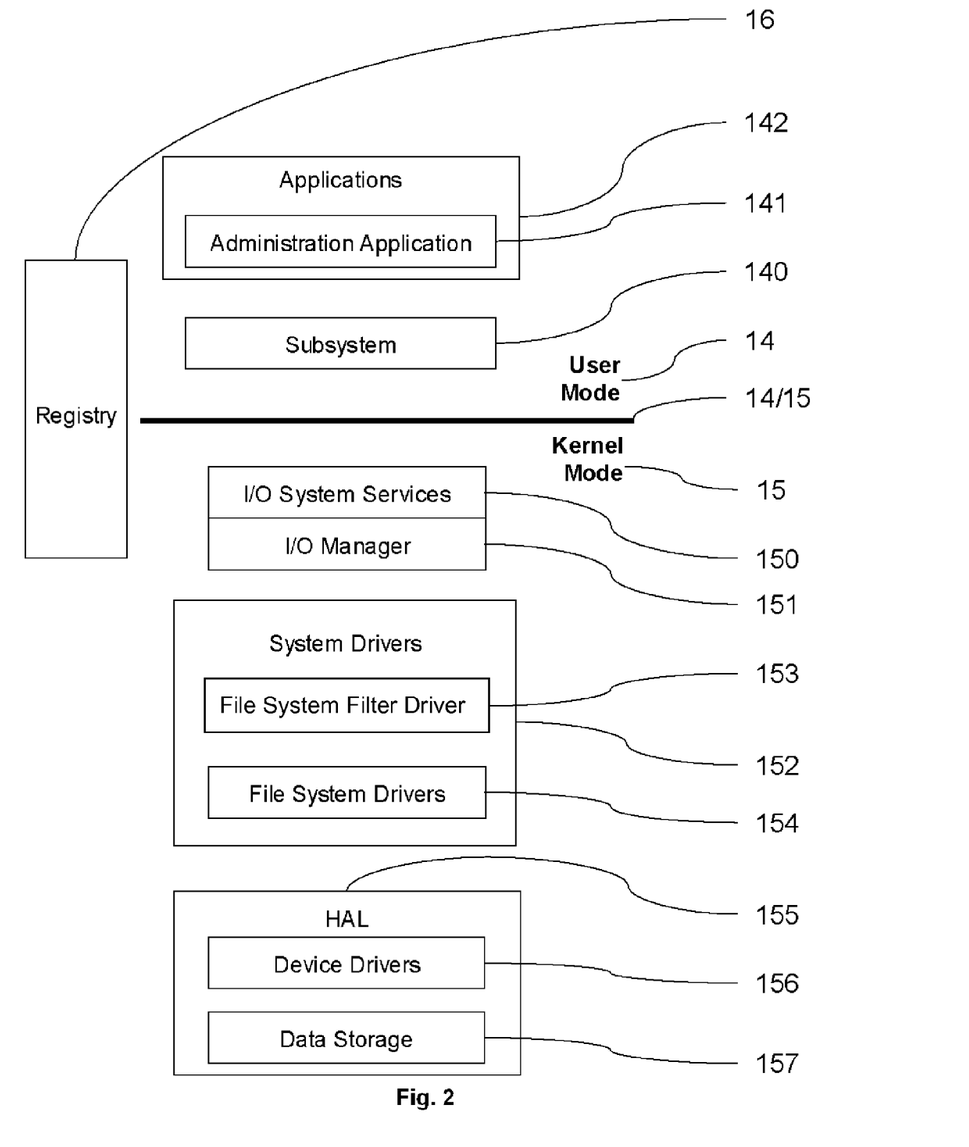
FIG. 2 shows a block diagram illustrating the architecture of an implementation of the inventive computer protection against malware affection.

FIG. 2 illustrates one preferable architecture of an implementation of the inventive computer protection technique against malware affection in the computer 1. The implementation is separated by a boundary 14/15 in a upper user mode 14 and a lower kernel mode 15. The user mode 14 comprises a user application layer 142 which illustrates application programs accessible by a user. One user application in the user application layer 142 is a protected administration application 141 allowing a verified user to adjust and to administer the computer protection against malware affection. Between the kernel mode 15 and the user application layer 142 a subsystem layer 140 is arranged. In the subsystem layer 140 a protected subsystem such as e.g. Win32 for Windows® by Microsoft® Corporation or POSIX for UNIX and Linux is running providing interfaces to the user application layer 142, i.e. routines, protocols, and tools for building and running applications, and hiding the kernel mode layers to the user of the computer 1. The subsystem layer 140 passes input/output requests of the user application layer 142 to a I/O system service layer 150 (Input/Output) in the kernel mode 15 containing I/O system services. The I/O system services are provided by a I/O manager layer 151 lying under the I/O system service layer 150 which prepares input/output request packets corresponding to the input/output requests received by the subsystem layer 140 and which passes the input/output request packets to a file system filter driver 153 of a system driver layer 152. The system driver layer 152 comprises various registered system drivers containing said file system filter driver 153 as an implementation of a filter module and the file system drivers 154 such as e.g. NTFS, FAT or CDFS drivers. The file system filter driver 153 detects a format of data affected by the input/output request packets, blocks input/output request packets for data of a predefined format and passes input/output request packets for data other than of the predefined format to the file system drivers 154. Under the system driver layer 152 the HAL 155 (Hardware Abstraction Layer) is situated comprising device drivers 156 which control the data storage 157. The file system drivers 154 pass the input/output request packets to the HAL 155 in which the storage of the data is completed. Besides the user mode 14 and besides the kernel mode 15 lies the registry 16 as a system database used to store configuration information in all layers described above.

For an embodiment of the present invention that relies on Windows® kernel drivers, and in particular file system filter drivers, an overview of these issues, and the concept of I/O services in the kernel in general, will now be provided with reference to FIGS. 1 and 2. Such a description will aid in an understanding of a Windows®-based embodiment of the present invention, and how it differs from the prior art, but it will be appreciated that the present invention is not limited to a Windows®-based environment (for example, on modern operating systems, e.g. Microsoft® Windows® and Unix®, software runs either in user mode, such as Outlook, or in kernel mode, such as services like network drivers and TCP/IP stacks).

An embodiment of the present invention will sometimes be referred to herein by the term "HDF", which stands for Hardware Disk Firewall, a function that is effectively performed by an embodiment of the present invention.

The term device driver refers to the software that controls the operation of a particular class of hardware devices, e.g. hard disk or tape drive. There are many classes of drivers, e.g. video drivers and network drivers [see http://www.microsoft.com/whdc/driver/foundation/DrvRoadmap.mspx].

The device drivers of interest in context of an embodiment of the present invention are file system drivers such as NTFS and FAT. User mode Win32 application programs do not run in the kernel space.

The Windows® architecture does not allow applications direct access to hardware, using the software protection layer called 'Hardware Abstraction Layer' (HAL), and it defines device-independent interfaces for applications to I/O operations on hardware devices. This abstraction enables applications to request I/O operations without regard to the physical characteristics of the underlying hardware devices.

Typical I/O operations on a hardware storage device are read and write requests. The kernel maintains a data structure called "services dispatch" tables. The tables map user mode function calls to Windows native APIs (Application Programming Interface), which are not fully documented. When an application makes a function call, the user mode function call (API) is mapped to the appropriate kernel native API call(s) and serviced by the kernel. For example, a user mode call to CreateFile( . . . ) is mapped to kernel function call ZwCreateFile( . . . ).

Some applications, for example the FileMonster® application, manipulate these undocumented dispatch tables ["Undocumented Windows 2000 Secrets: A Programmer's Cookbook" by Sven Schreiber, ISBN: 0201721872] and modify the entries to intercept system calls. Since Microsoft® has not documented nor recommended this approach, it is not considered good practice for system stability. For example, it two applications modify the dispatch tables, the system may not work correctly.

Windows provides I/O services by the I/O system services and I/O Manager kernel components. When an I/O request is received from the I/O system services component, the I/O Manager creates a data structure called an I/O Request Packet (IRP). The IRP is used to package and to dispatch the request and control messages to the target device driver via function codes. The function code is embedded in an IRP that a driver receives and acts on.

A driver implements and services function codes such as IRP_MJ_CREATE, IRP_MJ_CLOSE and IRP_MJ_DEVICE_CONTROL etc. and reports back status on completion. For example, when a Win32 application makes a CreateFile( . . . ) call, the I/O Manager calls the target driver's IRP_MJ_CREATE function code. Later, when the application calls ReadFile( . . . ) or WriteFile( . . . ), the I/O Manager dispatches IRP_MJ_READ or IRP_MJ_WRITE calls in the IRP. Likewise, when the application closes the file handle, IRP_MJ_CLOSE is called. The I/O Manager also returns an I/O request result to the caller, e.g. succeeded or failed.

Windows has a layered-drivers architecture that allows other kernel drivers to intercept IRPs destined to a target device driver. The intended purpose is to provide additional services; these intercepting drivers are called file system filter drivers, or just filter drivers. The filter driver used in an embodiment of the present invention will referred to herein as the "HDF" (filter) driver, or Hardware Disk Firewall filter driver, and is a file system filter driver that intercepts I/O requests to the file systems, e.g. NTFS.

In its initialization routine DriverEntry( . . . ), the HDF driver informs the I/O Manager the I/O requests it wants to intercept, by registering the necessary I/O function codes, and calls IoAttachDeviceByPointer( . . . ). The I/O Manager then dispatches IRPs, that are destined to the target drivers, first to the HDF filter driver for processing. HDF can request to receive only IRPs of interest but not all IRPs as explained here. The I/O Manager, on loading a driver, calls the "entry point" DriverEntry( ),and passes in a pointer of a data structure (the driver's DriverObject) together with a text string of its Registry path, which is not hard-coded so that HDF knows where to find its registry parameters. HDF performs initialization in DriverEntry( ) and fills out some, although not necessarily all, of the Driver Object structure's data members before returning to the I/O Manager. One data member is an array of IRPs of interest, for example "DriverObject→MajorFunction[IRP_MJ_CREATE]=HDFCreate;". In this case, HDFCreate( ) is called when there is a IRP_MJ_CREATE; one or more of IRP_MJ_WRITE, IRP_MJ_READ, IRP_MJ_FILE_SYSTEM_CONTROL and IRP_MJ_DEVICE_CONTROL are also registered (it is useful to intercept_READ to protect the HDF application image files themselves from unauthorized access so that other processes are prevented from opening application files relating to HDF. The read and write IRPs can be used for the purpose of blocking executables with unconventional extensions as set out elsewhere in this description).

The HDF driver intercepts I/O requests to create a new file (IRP_MJ_CREATE). The interception allows the HDF driver to inspect the file extension of the impending file create operation without the need to scan the file data. To deny the creation of executable files, the HDF driver blocks all write requests of execution code on the system. This is achieved by returning a status 'STATUS_ACCESS_DENIED' to the I/O Manager, which then fails the request and informs the caller application, e.g. Internet Explorer.

Figure 3:
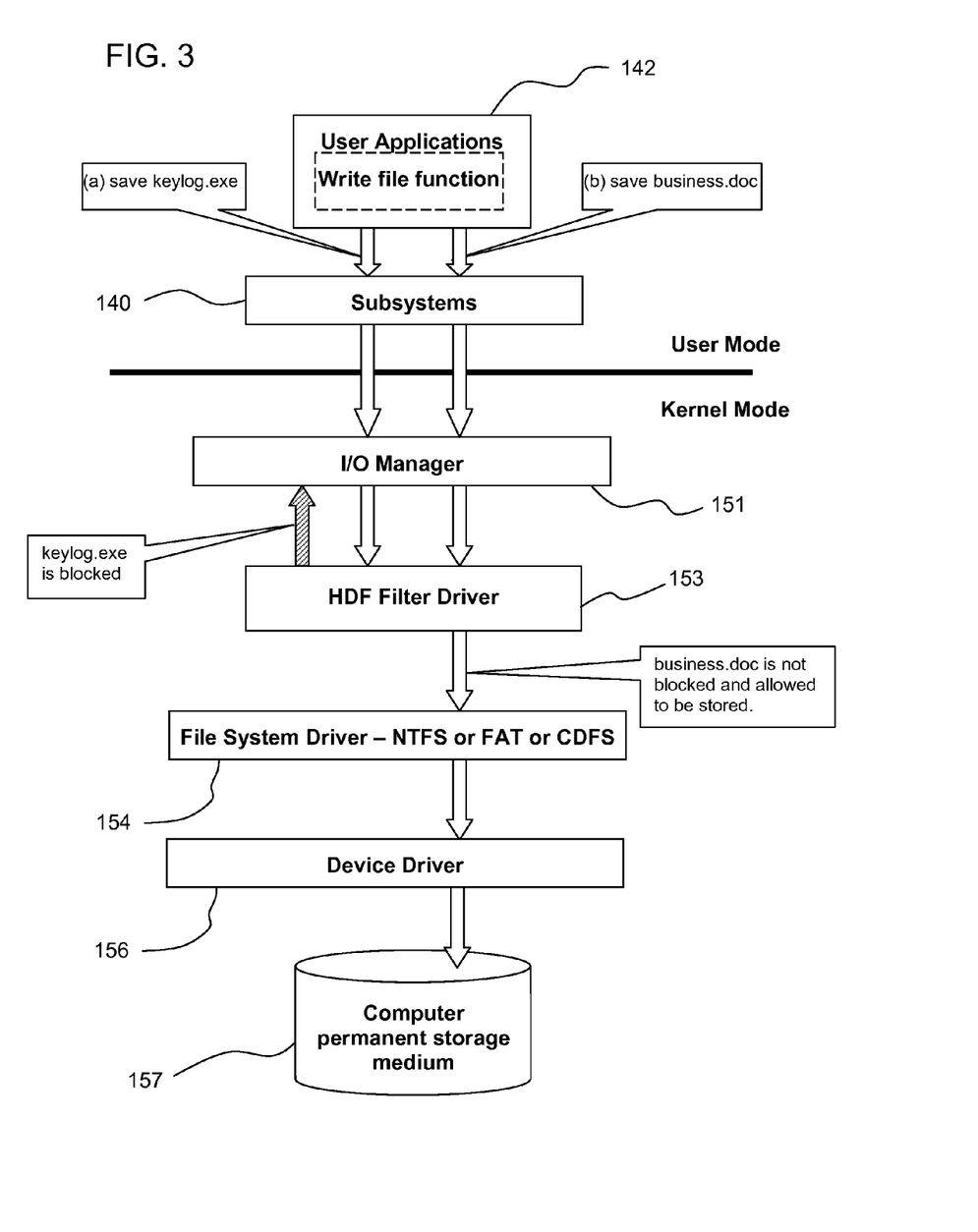
FIG. 3 is a block diagram illustrating operation of an embodiment of the present invention to block the writing of a certain type of file while allowing the writing of another type.

This is illustrated in FIG. 3, which shows the signal flow for two different attempted save operations: (a) an attempt to save a potentially harmful executable file "keylog.exe" to the storage medium 157; and (b) an attempt to save a harmless data file "business.doc" to the storage medium 157. As illustrated, the HDF filter driver 153 blocks the write attempt for "keylog.exe", but not that for "business.doc".

(It should be noted that checking file-extension is a common approach to identify file types on Windows platforms. On a Unix-based computer, executable files are identified by file attributes, for example. The present invention is not to be understood as limited to any particular method of determining the file type on any particular operating system.)

The protection of existing executable files is a side-effect of using a technique embodying the present invention, for the following reasons. For a malware to modify an existing executable file, the creation of a new file is still required, since the modified file is written back to the storage as a new file. Therefore, an attempt to modify an existing executable file on the storage will be caught by checking for IRP_MJ_CREATE as set out above. There does not need to be a check as to whether a completely new file is being created and written, or whether it is an existing file that is being modified and then written back as a new file.

For any data that is written to storage, there is always an IRP_MJ_CREATE (to create a new file, whether it be for completely new data or for data modified from an existing file) followed by an IRP_MJ_WRITE (to actually write the data to the storage), arriving in different IRPs. If the file extension of a file to be created or modified is recognised as an executable, then the IRP_MJ_CREATE check will be sufficient to catch the malware at the time of requesting a new file, and this will block any attempt to create or modify the file.

However, in an attack scenario where malware tries to create or modify an executable file without an expected file extension, e.g. keylog.abc, then the file will pass the above IRP_MJ_CREATE check. To handle such a scenario, the HDF driver can inspect the impending file's data for the PE file header (for which, see below). This is desirable because the HDF driver would otherwise not deny the writing or modification of 'keylog.abc' because it has a non-executable file extension. For this purpose, the HDF driver can also intercept the write data request (IRP_MJ_WRITE). If the I/O request is detected as writing execution code, i.e. PE file structure, then the HDF driver would deny the I/O request by returning a status 'STATUS_ACCESS_DENIED' to the I/O Manager which then fails the request and informs the caller application, e.g. and Outlook® email client. With this method it is only necessary to check the PE header, unlike known anti-virus tool which have to scan the entire file for a malware signature because all executables will have a PE header.

For the reasons mentioned above, an attempt by a trojan or malware to attach itself to an existing executable would be caught, since it needs to write/add itself to the target image file. HDF can block Alternative Data Stream (ADS) as well. If it is DLL-injection type of attack, then the malware does not need to change the target executable but just "injects" itself in the target memory space and piggybacks on the hijacked process, which performs the deeds of the malware. The attack is to make the target process load and run the attacker's DLL. However, the malware needs to transfer itself (execution body, as a DLL mostly) to the victim machine and cannot do it "over the web". HDF would not protect against memory-based attacks as such, but would stop the DLL being installed to the computer, which is essential for this attack to work.

Exceptions to blocking are provided to allow explicitly-approved write requests. Before returning a 'STATUS_ACCESS_DENIED', the HDF driver checks if the user has defined a rule to indicate that either (a) the requesting process is trusted or (b) the system account under which the request made is trusted. If there is an affirmative match, the HDF driver passes the I/O request to the destined device driver, e.g. NTFS, to perform the requested operation, via a call IoCallDriver( . . . ) with the original IRP.

Under Microsoft® Windows® 32-bits operating systems, all native applications are Win32 executables. The operating system loads and runs execution code and does not differentiate if the code is legitimate or not, i.e. whether the user allows running of the specific code. For brevity, access control list (ACL) and user privileges will not be described here, which are largely irrelevant in the context of an embodiment of the present invention. With HDF, write-denial control would not typically be affected by the access control list (ACL) settings nor user privilege on the computer.

To run an application, the OS checks whether the execution code conforms to the Portable Executable File Format specification, e.g. PE format on all Windows 32-bit operation systems. This applies also to interpreted code, e.g. VB script, and Microsoft® specifies the interpreted code 'run-time-engine' must be in PE format.

The PE format is a Microsoft® specification that all PE files have a standard file structure with an "IMAGE_NT_HEADERS" signature, code and data sections. A PE file starts with two signature characters 'MZ' (called the DOS MZ header) and followed, after a DOS stub, by another PE signature with the characters 'PE\0\0'.

The OS recognizes an executable file by its file extension, and the loader ensures it is a valid PE file when loading the file and run the execution code. A requirement for execution code is that the executable file must be accessible on disk, local or remote, i.e. the execution code cannot reside on a remote Web server.

Checking the existence of the PE file format structure is a documented method by which the HDF driver can identify an executable file. This method is also used by other anti-malware applications for different purposes to HDF.

The NT kernel treats its internal entities as objects, these objects represent files, devices and so on. The kernel internal objects can be either named or unnamed. For named device drivers, the kernel maintains two lists of names in its internal object tree database. Each named device driver, e.g. the HDF filter driver, may have two names in the database. One is the driver's NT device name (Microsoft's terminology) intended for a driver to refer to the device it manages, and the other is a 'symbolic link' name. Of particular interest in an embodiment of the present invention is the HDF driver's symbolic link name, which is described as the driver's identifier for brevity here. It is noted that these internal names are not the driver image file name. For example, the HDF driver's NT device name might be "Device\HDFIoCtl", its symbolic link name might be "DosDevice\HDF" (default), and the image file filename might be "HDF.SYS" (which would generally not change).

Both the NT device name and symbolic link name are supplied by the device driver to the operating system kernel, typically during the driver's initialization routine. A device driver creates the NT device name by a kernel API call IoCreateDevice( . . . ), and the symbolic link name by a call to IoCreateSymbolicLink( . . . ).

The symbolic link name is for the sole purpose of making the driver visible to user mode applications. A user mode application requires a driver's symbolic link name in a function call to communicate with the driver. When an application requires to communicate with a device driver, it calls Win32 APIs CreateFile( . . . ) passing in the driver's symbolic link name as a parameter, followed by DeviceIoControl( . . . ) using the returned driver's handle as parameter. An application is not able to use the driver NT device name that is visible in the kernel space only.

To control computer storage devices, HDF is implemented at the operating system kernel level close to the hardware layer drivers. Technically, HDF is a "file system filter driver" in the Microsoft® operating system architecture. HDF intercepts 'write-file' instruction (not API calls) issued by the system to the file system drivers.

In the initialization routine, the HDF driver makes the function calls of IoRegisterFsRegistrationChange( . . . ) and IoAttachDeviceByPointer( . . . ). After the calls, the kernel I/O Manager routes I/O requests that bound for the target device to the HDF filter driver first (as set out above). From that point on, the HDF driver receives I/O requests to all storage devices on a system and performs write-denial control, until the system shuts down.

Figure 4:
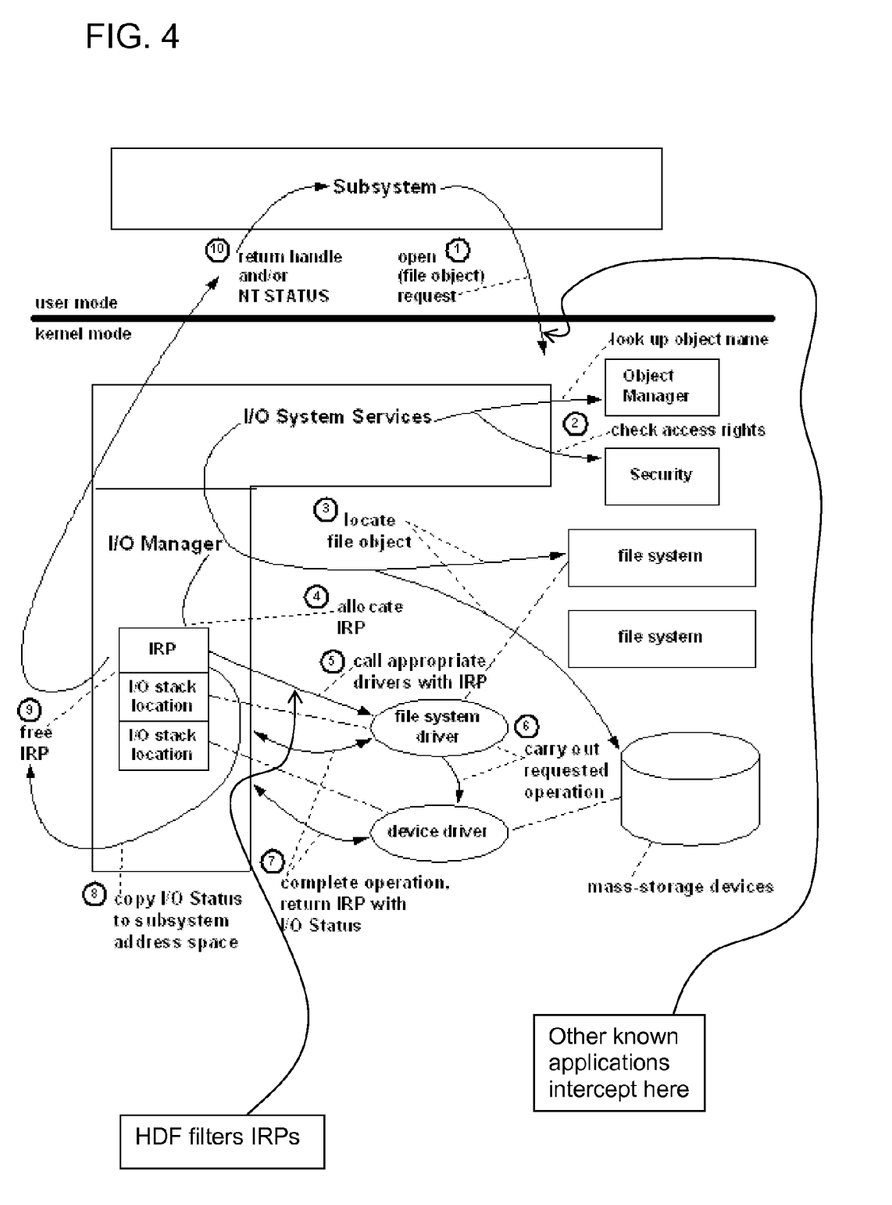
FIG. 4 is an diagram for illustrating in more detail the processing of an I/O request in the kernel within the context of the present invention.

The processing of an I/O request in the kernel, and the role of HDF, is illustrated in more detail in FIG. 4. In brief, the steps shown are:
1. A user mode API call gets mapped to a kernel call.
2. The I/O System Services serves the I/O and . . .
3. involves I/O Manager.
4. The I/O Manager creates a new IRP for that request.
5. The I/O Manager sends the IRP down the driver stack, where the HDF may intercept it.
6. The destined driver completes the IRP, if not blocked by HDF
7. The I/O request is completed.
8. The I/O status is copied to the subsystem address space.
9. The IRP is freed.
10. A handle and/or NT STATUS is returned.

As can be seen, HDF intercepts close to the hardware level. By contrast, an application such as FileMonster® intercepts much higher up, as marked in FIG. 4. If a blocking occurs with HDF, steps 6 to 8 are skipped, with HDF returning the IRP to I/O Manager to perform step 9.

HDF intercepts e.g. the I/O Manager's "write-file" instruction and passes on other I/O instructions not relevant to HDF to the destined file system driver such as NTFS. On receiving a 'write-file' instruction contained in an IRP (described above), HDF checks and acts accordingly:
  If the write-file target is an executable not approved by the user—return a "STATUS_ACCESS_DENIED" status so that the I/O Manager informs the caller of failure. In this case, no executable file will be stored on the target storage device (HDF primary objective).
  If the write-file target is an executable approved by the user—no action by HDF and pass the IRP to the destined file system driver to carry out the writing.
  If the write target is not an executable, e.g. business.doc—no action by HDF and pass the IRP to the destined file system driver to carry out the writing.

HDF can determine if a write-file target is an executable file by checking:
  The file extension—from a Microsoft documented executable file extensions list, and;
  The executable file format signature called PE format, when the file extension is not covered above (as described above).

HDF can determine if a user approves writing of an executable by:
  A list of user-defined trusted processes that are allowed to write executable files—the default being none so that no process is allowed to write an executable file by default.
  A list of user-defined trusted system logon accounts (user and group account scope) that are allowed to write executable files—the default being none so that no account privilege is allowed to write an executable file by default.
  User action, i.e. user turns off HDF blocking via an administration application to install software; in one implementation the administration application is a standard Win32 command line application called HDFControl.exe and its GUI counterpart HDFMonitor.exe.

The HDF driver can obtain the above two lists (trusted processes and trusted accounts) from two sources:

The Windows specified Registry entry for driver parameters at [HKEY_LOCAL_MACHINE\SYSTEM\currentControlSet\Services\driver_name\Parameters], where driver_name is, for example, "HDF", or Passed in as parameters by the administration applications at run time.

In general, an HDF implementation would not block writing of data or non-executable file types, although it is simple to reconfigure HDF to control writing of any file type in addition to executable file types.

The HDF driver's ability to block writing of executable files would not typically be affected by the requesting process's account privileges. Therefore, malware would not interfere with blocking even it has administrator or Local System elevated privileges obtained by successful attacks. However, to allow a user to install new software and system patching, HDF can provide an administration application for turning off blocking temporarily. An embodiment of the present invention can use a security method to ensure only the intended administration application is able turn off HDF blocking, and such a feature can be an important part of HDF application security.

Three such methods will be described below for authenticating the calling application. The first one is a completely new approach and the others involve using existing cryptography techniques in a new context to resolve authentication problems particularly associated within the context of an embodiment of the present invention.

Before a description of these authentication methods, the method by which a malicious process can attempt an attack will first be described in brief.

The administration application will be sending runtime instructions to the HDF driver, and in a secure approach the HDF driver would ensure that the instructions come from its administration application and not other malicious process. The threat comes from impersonation attacks because any application can send instructions to a driver if it knows the driver's identifier. Technically, the term driver's identifier refers the driver's internal 'symbolic link name', as described above.

The Microsoft® architecture enables an application to communicate with a kernel driver by calling two functions; CreateFile( . . . ) and DeviceIoControl( . . . ). One of the function parameters is the driver's identifier; in an HDF context this is "DosDevices\HDF". The driver provides its identifier to the operating system at runtime via a function call IoCreateSymbolicLink( . . . ). Through this call, the system knows by name which driver to receive a calling application's instruction.

The risk to HDF is that a malicious process could establish an extra illegal communication path in parallel to the administration application and send instructions to the HDF filter driver. For this attack to work, the malicious code needs to know the HDF driver's identifier. Typically, the driver's identifier is hard-coded in the driver execution code and an attacker can discover it with relative ease, e.g. execution code disassembly. A runtime dynamic identifier thwarts this attack vector. Without the driver's identifier, a malicious process cannot establish communication nor send instructions. This forms the basis of the new HDF solution to mitigate the attack risk, and the other methods involving using cryptographic means to authenticate the communication parties. There is no known method for a driver to authenticate the calling application. It will be appreciated that the described methods can be used in combination to further improve application security.

The first approach described herein is to use a changing dynamic driver's identifier. The scheme is that the HDF driver changes its identifier during runtime via IoCreateSymbolicLink( . . . ) calls, and informs its administration application of the newest identifier by a secure means. Since only the administration application knows HDF driver's identifier at a specific point in time, only the administration application can communicate with and send instructions to the HDF driver. The change can be triggered by every instruction call or using a time-based scheme. If a malicious program uses an 'expired' identifier to send instructions to HDF driver, the system will not able to dispatch and abort the call. In essence, HDF protects its identifier from arbitrary application to authenticate communication.

By way of further explanation, the HDF driver has a default identifier with which the administration application can communicate for the first time. In the DeviceIoControl( ) call, the administration application passes to the driver a custom I/O control code, e.g. unblock flag or get configuration settings, and a user-space data buffer. The HDF driver performs the request function and if needed fills up the caller's data buffer. The driver can return the next identifier in the data buffer for the caller to use the next time—this is the "every instruction call" option mentioned above. With the "time-based" option mentioned above, the driver changes its identifier and the administration application makes the same change to the last used identifier independently, but according to some pre-arranged synchronization scheme. For example, the driver may append a number to the end of the identifier's fixed part, e.g. HDF, so that the new identifier would be HDF29 in a scheme where the minutes of the hour are used; 29 minutes passed the hour in this example. In this case the synchronization scheme is a shared secret.

The second and third approaches will now be described. Using cryptographic means to authenticate communication has been used in security applications, but is not known in the context of protecting the sending of instructions from an application to a device driver.

The second approach is to use a standard encryption algorithm such as Advance Encryption Standard (AES—FIP 197) (note: AES is just one of many algorithms that can be used; other examples are RSA, DES etc.) to encrypt the communication data between the administration application and the HDF driver. Because only the two software components know the data decryption key to decrypt data, the communication between the administration application and the driver is secured. To set up the authentication scheme, a standard method called Diffie-Hellman Key Agreement Protocol can be used so that the calling application and the HDF driver each has a shared-secret key. A malicious process is not able to impersonate the calling application and send false instructions to the driver.

The third approach involves a cryptographic authentication method known as Challenge and Response. To set up the authentication scheme, the Diffie-Hellman Key Agreement Protocol can be used so that the calling application and the HDF driver each has a shared-secret key. As an example, authentication would work by the following steps:

1. The HDF driver sends a random number to the calling application for authentication, the Challenge;
2. The calling application uses the shared-secret key to encrypt the random number and returns the encrypted result to the HDF driver, the Response;
3. The HDF driver then uses its shared-secret key to encrypt the random number it generated before;

4. The HDF driver compares its own result and the calling application's Response;
5. The authentication succeeds if the two results match, because only the two components know the shared-secret key to compute the encrypted values.

Figure 5:
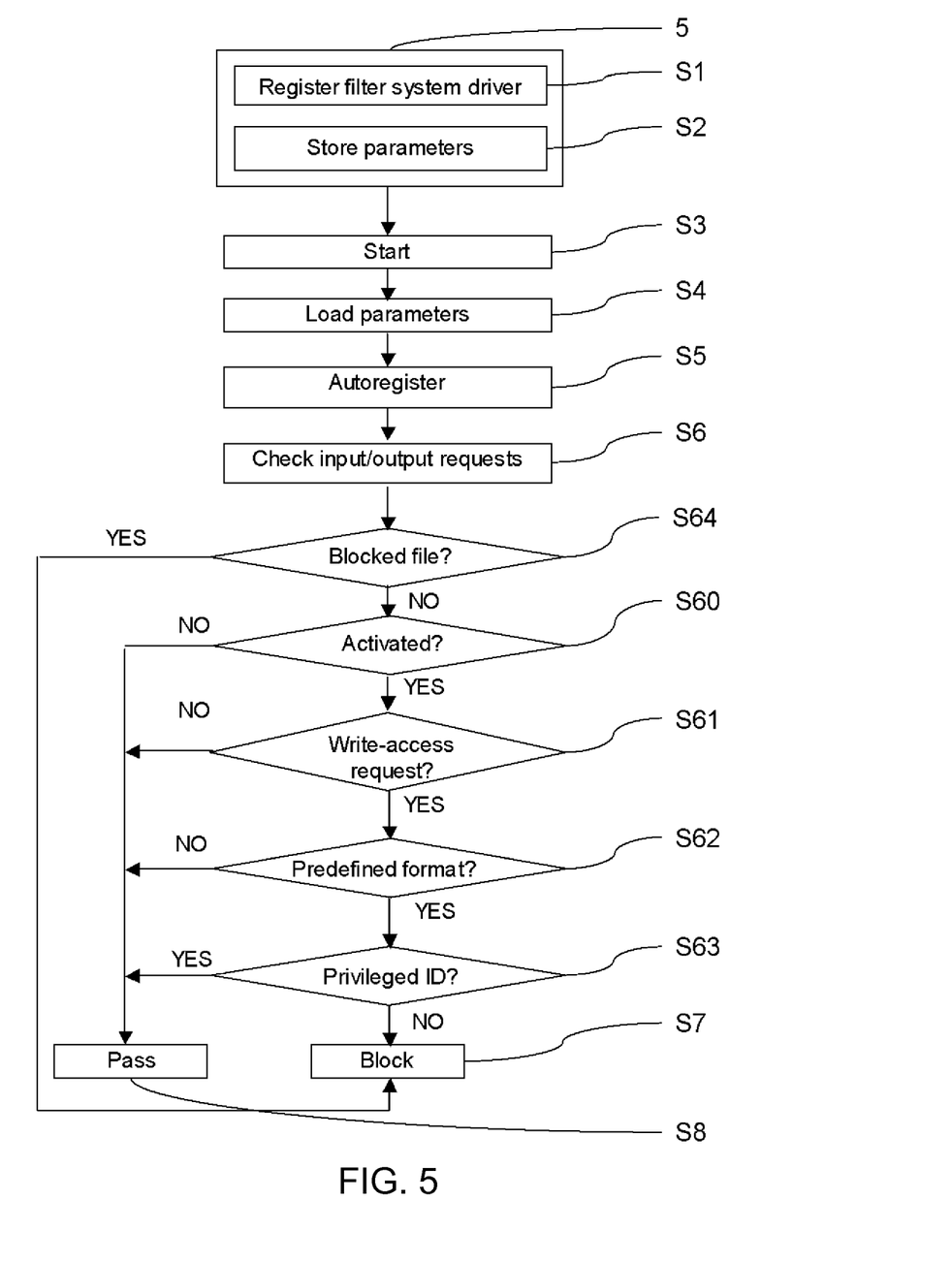
FIG. 5 shows a flow diagram of a program logic flow of an inventive computer protection against malware affection.

Taking into account the above explanations, the steps performed by an embodiment of the present invention will now be described with reference to FIG. 5. The program logic flow of an inventive computer protection against malware affection shown in FIG. 5 illustrates in more detail an implementation of the file system filter driver 153 and the administration application 141 as described above. By way of example, the implementation is illustrated for a computer running a Microsoft® Windows® operating system.

In step S1, the file system filter driver 153 is registered with the operating system of computer 1 as a file in a kernel mode system driver. For example, the file system filter driver 153 "name.sys" (e.g. "name" here and below may be "hdf", so that the driver would be "hdf.sys") is registered by copying the program file preferably in a write protected manner to the according system folder, e.g. "WINDOWS\System32\Drivers\" (for Windows® XP), and the corresponding value is set in the registry 16, e.g. "[HKEY_LOCAL_MACHINES\SYSTEM\CurrentControlSet\Services\name]".

In step S2, parameters used for adjusting the operation of the file system filter driver 153 are stored in a protected key of the registry 16, e.g. in the key "[HKEY_LOCAL_MACHINES\SYSTEM\CurrentControlSet\Services\name\Parameters]". For example, following values are set in the protected registry key: "Active"=dword:00000001" as a flag with a predefined value for activating and deactivating the file system filter driver 153; "Extensions"=".COM; .EXE; .DLL; .BAT; .CMD; .OCX; .VBS; .PIF; .SCR; .CHM; .DRV; .HTA; .SHS; .WMA; .WSF; .WSH; .CPL; .CAB;" as a file extension list for predefining the data format types to be blocked by the file system filter driver 153; "Names" [or "Protected"]="name.SYS; name.LOG; name.EXE; HDFMONITOR.EXE;" as a blocking list of files which are always protected by the filter system 152 program file, the name of the filter system 152 program file's image files, the name(s) of an administration application 141 program file (there may be two such program names; e.g. hdfcontrol.exe and hdfmonitor.exe as set out elsewhere) and the name of a log file; "Sids"=" " as an empty non-block user id list being ready to be adapted by the administration application 141 (to allow users or groups to write legitimately to storage, defaulted to empty, i.e. no user or group is allowed by default; it is possible to separate the user ids from the group ids by specifying the former with a "UserSids" parameter and the latter with the "Sids" parameter); "LogPath"="C:\nameLog" as a path definition where to store the log file reporting at least all blocking activities of the file system filter driver 153; and "AllowedProcesses"=" " provides a list of process names that the user allows explicitly to write executable files; this defaults to empty but can be changed by the user with the administration application 141. To provide maximum flexibility, HDF parameters can also be changed during runtime. However, with HDF it is not necessary to write to the Registry during runtime, unlike for some other existing applications.

Step S1 and step S2 are part of an Initialization 5 which is conducted at least once during installation of the computer protection against malware affection either by an installation program of the computer program product according to the invention or by a system administrator.

In step S3, the file system filter driver 153 is launched either on user request by the administration application 141 or during each booting process of the computer 1.

In step S4, the file system filter driver 153 reads the parameters stored in the registry 16 as mentioned above.

In step S5, the file system filter driver 153 creates a randomly generated dynamic name, registers the name with the operating system and stores the name in the registry.

In step S6, the file system filter driver 153 receives input/output request packets from the input/output manager 151 and performs the following:

Step S64, checking if a file name of the data file is part of the blocking list stored in the registry 16. If the file name of the data file matches a name of the blocking list, the file system filter driver 153 continues with step S7, otherwise it continues with step S60.

Step S60, checking whether the flag for activating and deactivating the file system filter driver 153 is set to the predefined value. If the flag is set to the predefined value, the file system filter driver 153 continues with step S61, otherwise it continues with step S8.

Step S61, checking whether input/output request packets received is related to a write access request. For example, the file system filter driver 153 checks whether the input/output request packet includes a function code as e.g. "IRP_MJ_CREATE". If the input/output request packets are related to a write access request, the file system filter driver 153 continues with step S62, otherwise it continues with step S8.

Step S62, checking whether the format of the data file associated with the write access request is of the predefined format type. Preferably, the checking of the format is performed by comparing a file extension of the data file associated with the write access request to the file extension list stored in the registry 16. If the data file associated with the write access request is detected to be of the predefined format type the file system filter driver 153 continues with step S63, otherwise it continues with step S8.

Step S63, comparing the user identification information associated with the write access request to the non-block user id list stored in the registry 16. If the user id matches a user or a user group of the non-block user id list the file system filter driver 153 continues with step S8, otherwise it continues with step S7.

In step S7, the file system filter driver 153 blocks the write access request, informs the I/O manager 151 about the blocking, and logs the blocking activity in the log file.

In step S8, the file system filter driver 153 passes the input/output request packets to a subsequent system driver such as the file system driver 154.

Other alternative embodiments of the computer protection against malware affection according to the invention are realizable. Explicitly mentioned in this context are:
  The file system filter driver can be placed in the kernel below the mounted file system divers, and above the lower level hardware driver for the storage media.
  The data format of a data file can be detected by the file system filter driver reading the file header of the data file.
  Preferably the file extension list for predefining the data format is stored on one hand in the registry and on the other hand in a protected binary data file. The adaptations made by the administration application affect the file extension list in both locations. The file system filter driver reads the file extensions from both locations and produces an error if they don't match. Like this additional security can be implemented into the computer protection against malware affection.

An embodiment of the present invention has one or more of the following technical benefits:
- It can load and run as part of the operating system such that it cannot be disabled, i.e. during system boot up and before any user logging in.
- It can resist hacking and attack attempts to shut down operation, e.g. by hostile malware or user mistakes.
- It is able to identify and block executable files without pattern matching.
- It can function autonomously irrespective to system privileges of the user account, caller processes and threads.
- It can function transparently to users and applications. All applications can run as normal. There is no requirement for pop-up dialogs or other user alerts during operation.
- It supports local, networked and removable storage devices, and plug-and-play mounted devices are protected automatically.
- Operations, whether blocking or non-blocking (pass through), can be logged for audit trail purposes.
- It has a small application footprint, and does not degrade performance.
- It is compatible with existing anti-virus programs, personal firewalls and scanning tools.
- It does not require maintenance, and has reliable operation.

An embodiment of the present invention:
- Is able to prevents malware infection against a computer using an innovative concept of blocking all executable code entering a computer. This new approach resolves the shortcomings of current technologies used by anti-virus, anti-spyware and rootkit detection solutions. It is a new malware-prevention method, rather than a malware-detection approach.
- Is able to protect against the so called "zero-day" malware and recent rootkit spyware without false-positive, with a single tool. "Zero-day" malware refers to malicious code that anti-malware vendors have not yet identified or not released a pattern signature of the malware. Rootkits are malicious software that renders itself undetectable on infected systems.

Although the above description has focussed on the Windows family of operating systems, it will be appreciated that an embodiment of the present invention applies equally and correspondingly to other types of operating systems that support an architecture having a protected kernel environment, e.g. Unix, Linux and Mac OS. The skilled person will readily appreciate that certain components and methods that are specific to Windows® will have corresponding components and methods in other environments. As one example, using the Registry as set out above to store HDF parameters is Windows-specific; on other environments the parameters would be stored by some other means, e.g. file-based or over the network, e.g. using a service/daemon. In addition, use herein of terms such as "input/output manager", "file system filter driver" and "I/O Request Packets" (in particular their use in the appended claims) is not intended to imply any limitation to a Windows® type of operating system; instead these terms are to be understood as applying to the equivalent part or parts and the equivalent messages in any other type of operating system or environment, whatever terms are normally used when describing that operating system or environment.

With Linux, for example, user applications generally cannot access the hardware directly. The Linux operating system relies on a kernel software comprising various device driver types to provide user applications input/output services to hardware, e.g. ISO 9660 filesystem for CD-ROMs, SMB filesystem for Microsoft Windows servers. Device drivers are developed to integrate into kernel core software or developed as 'loadable device drivers' modules, which are kernel components but not integrated into the kernel core. 'Loadable device drivers' typically load into memory during boot-time. Device drivers provide input/output access to the hardware to which generally user applications cannot access direct.

An embodiment of the present invention can be developed to a Linux filter device drivers and adapted to intercept input/output requests to hardware from user applications. In the same manner as described above, an embodiment of the present invention when implanted with on a computer under the Linux operating system will therefore follow the policy of denying writing to hardware storage when the data format is determined as execution code, for example, by examining the file's "execute permissions" attributes, because Linux executable code depend not on a file extension but on the file permissions attributes.

The current operating system for the Macintosh is Mac OS X that is built on top of the Berkeley Unix implementation (FreeBSD 4.4) and Darwin. The OS X kernel is called XNU, which is a modern operating system with a user space and kernel core architecture. The kernel provides mechanisms and interfaces for user applications to make input/output requests to hardware devices through a kernel software called "I/O Kit". The I/O Kit component is the kernel device driver framework and includes numerous device driver types for e.g. hard disks and other storage devices.

Mac OS X, like other OSs, uses files and directories to store data and execution code, and identifies file types by file extensions. Executable files are organized into a directory together with its resource files (unlike Windows® executables which store execution code and resources in the same file, *.EXE), and is called an "application bundle". The I/O Kit framework supports driver stacking which is a similar concept to Windows layered-drivers architecture as described above. The driver stacking features allow a skilled person to develop a filtering module to intercept writing of executables to storage devices following the same principles as set out above in the main description of an embodiment of the present invention to achieve protection from malware infection.

The skilled person will readily appreciate how to adapt the present invention for use with other such types of operating system, and operating systems for other types of computing devices such as handheld devices, cell phones, Smartphones, PocketPCs, Personal Digital Assistants (PDAs), Blackberry® devices, TV set-top boxes and any future such devices having a computing (CPU) unit and storage. The terms "computer" and "computer program" in the appended claims are intended to cover such devices.

Although the above description has referred to a program stored on a computer-readable medium, it will be appreciated that a computer program embodying the present invention need not be stored on a computer-readable medium and could, for example, be embodied in a signal such as a downloadable data signal provided from an Internet website. The appended claims are to be interpreted as covering a computer program by itself, or as a record on a carrier, or as a signal, or in any other form.

What is claimed is:

1. A method of preventing malware from being written, by an application, to a permanent or persistent data storage of a computer, the method comprising:
   providing a filter module in an operating system of the computer, wherein the filter module is arranged to operate between an input/output management system of the operating system and a driver associated with the data storage, wherein the input/output management system is arranged to operate between the application and the driver associated with the data storage, and wherein the filter module is further arranged to, prior to and without storing any data in a file in the data storage:
  detect an attempt by the application to store the data in the file in the data storage by intercepting a write access request originating from the application and intended for the driver associated with the data storage, wherein the write access request is a data packet or data structure comprising a function code appropriate to the underlying architecture of the operating system to indicate a write access request;
  check if a file name of the file to be created associated with the write access request is part of a blocking list;
  if the file name does not match a name in the blocking list, the filter module is further arranged to:
  check whether the data to be stored in the data storage via the detected attempt is an executable data format or a non-executable data format by inspecting a write data request associated with the write access request, wherein the write data request is a data packet or data structure comprising a function code appropriate to the underlying architecture of the operating system to indicate a write data request, to determine if the write data request includes a portion of a file header associated with executable data, wherein the file header is a file header appropriate to the underlying architecture of the operating system to indicate executable data; if the write data request includes a portion of a file header associated with executable data, the filter module is further arranged to;
  prevent the storage of the data in the file in the data storage and return an indication that the request is denied to the input/output management system;
  thereby blocking an unauthorized attempt to write data to the data storage that could potentially constitute malware without having to examine or screen the data content, and thereby preventing malware from propagating at its propagation phase by preventing execution code of the data from being saved to the data storage.

2. The method of claim 1 wherein the application is a system process.

3. The method of claim 1, comprising providing an administration application to enable the user to turn off the blocking, in order to allow the user to install software or perform other routine maintenance.

4. The method of claim 1, wherein the filter module is provided as a file system filter driver in a kernel of the operating system.

5. The method of claim 1, wherein the input/output management system and driver associated with the data storage form part of a kernel of the operating system.

6. A computer program embodied in a non-transitory computer-readable medium which, when run on a computer, causes the computer to carry out a method as claimed in claim 1.

7. A computer comprising a permanent or persistent data storage, an operating system for managing the data storage, and a filter module provided in the operating system for thwarting malware at its propagation phase to protect the computer against malware infection, the filter module being arranged to operate between an input/output management system of the operating system and a driver associated with the data storage, wherein the input/output management system is arranged to operate between an application and the driver associated with the data storage, and wherein the filter module is further arranged to, prior to and without storing any data in a file in the data storage:
  detect an attempt by the application to store the data in the file in the data storage by intercepting a write access request originating from the application and intended for the driver associated with the data storage, wherein the write access request is a data packet or data structure comprising a function code appropriate to the underlying architecture of the operating system to indicate a write access request;
  check if a file name of the file to be created associated with the write access request is part of a blocking list;
  if the file name does not match a name in the blocking list, the filter module is further arranged to:
  check whether the data to be stored in the data storage via the detected attempt is an executable data format or a non-executable data format by inspecting a write data request associated with the write access request, wherein the write data request is a data packet or data structure comprising a function code appropriate to the underlying architecture of the operating system to indicate a write data request, to determine if the write data request includes a portion of a file header associated with executable data, wherein the file header is a file header appropriate to the underlying architecture of the operating system to indicate executable data; if the write data request includes a portion of a file header associated with executable data, the filter module is further arranged to;
  prevent the storage of the data in the file in the data storage and return an indication that the request is denied to the input/output management system;
  thereby blocking an unauthorized attempt to write data to the data storage that could potentially constitute malware without having to examine or screen the data content, and thereby preventing malware from propagating at its propagation phase by preventing execution code of the data from being saved to the data storage.

8. A computer program embodied in a non-transitory computer-readable medium which, when loaded into a computer, causes the computer to become one as claimed in claim 7.

9. The computer of claim 7 wherein the application a system process.

10. The computer of claim 7, comprising providing an administration application to enable the user to turn off the blocking, in order to allow the user to install software or perform other routine maintenance.

11. The computer of claim 7, wherein the filter module is provided as a file system filter driver in a kernel of the operating system.

12. The computer of claim 7, wherein the input/output management system and driver associated with the data storage form part of a kernel of the operating system.

* * * * *